April 13, 1937.  H. S. MILLER ET AL  2,077,125
LAMINATED SHOE STIFFENER
Filed Feb. 25, 1935
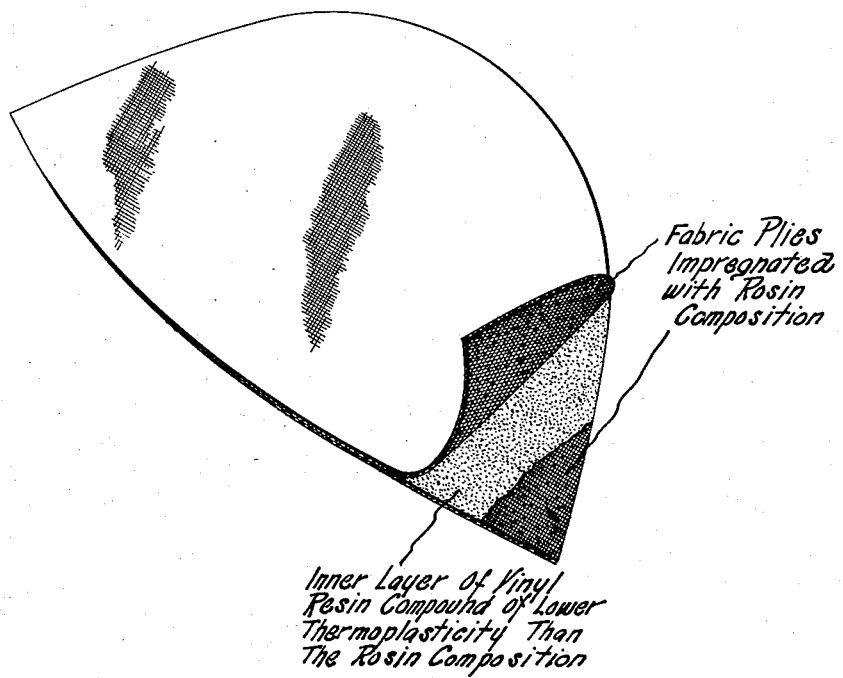
Inventors
Harold S. Miller
Charles P. MacIver Patented Apr. 13, 1937

2,077,125

UNITED STATES PATENT OFFICE 2,077,125

LAMINATED SHOE STIFFENER

Harold S. Miller, Quincy, and Charles P. MacIver, Newton, Mass., assignors to Beckwith Manufacturing Company, Dover, N. H., a corporation of New Hampshire Application February 25, 1935, Serial No. 8,044

6 Claims. (Cl. 36—77)

This invention relates to a laminated shoe stiffener, being more especially concerned with a so-called thermoplastic stiffener such as can be incorporated into the toe end portion of a shoe upper in a heat-softened moldable condition and molded to the shape of the last during the pulling-over and bed-lasting operations.

The thermoplastic stiffener of the prior art is usually a single-ply structure, for instance, a felt impregnated with suitable thermoplastic stiffening compound. In order to realize the desired plasticity and adhesiveness in the heat-softened stiffener to permit its ready conformation to the last and its bonding or integration with the lining and/or doubler fabric of the shoe upper, it has been the practice to use as the stiffening impregnant for the felt or other fibrous base a thermoplastic compound of such high plasticity and adhesiveness at moderately elevated temperatures that the heat-conditioned stiffener blank necessarily also became so limp, distortable, and easily wrinkled, as to be spoiled or improperly assembled with the shoe upper, unless carefully handled by the operator. Moreover, the preferred thermoplastic compounds, such as rosin compositions, that possess the desired high degree of thermoplasticity and adhesiveness at moderately elevated temperatures are quite friable or brittle and hence fail to impart to the stiffener the desired high degree of flexibility, the stiffener blank tending to crack or "break" when bent to a sharp angle.

In accordance with the present invention, we provide a laminated shoe stiffener which, although characterized by its thermoplasticity as a whole at temperatures non-injurious to leather and consonant with ready moldability thereof to the shape of a last during the lasting of a shoe upper with which it is assembled, is nevertheless made up of layers or plies of varying thermoplasticity or response to the heat-conditioning treatment usually applied thereto. More particularly, the shoe stiffener of the present invention comprises outer layers of suitable fabric or fibrous material impregnated with a thermoplastic compound of high plasticity and adhesiveness under the usual elevated conditioning temperatures and a layer of thermoplastic compound in between the outer layers of sufficiently lower thermoplasticity to avoid flabbiness in the stiffener under such temperatures. Thus, the outer layers may contain a thermoplastic impregnant of high plasticity and adhesiveness at conditioning temperatures of, say, about 200° to 212° F., whereas the layer of thermoplastic compound in between the outer layers may be of sufficiently lower thermoplasticity to make for the desired degree of rigidity in the heat-conditioned stiffener, that is, a degree of rigidity tending to preserve the heat-conditioned stiffener unimpaired while it is being handled and incorporated into the shoe upper preparatory to the pulling-over operation. It thus becomes possible to use rosin compositions to good advantage in the outer layers, since the friable or brittle character of such compositions may be offset in considerable measure by using as an inner layer the compounds available therefor possessing the desired flexibility and so functioning to prevent cracking of the stiffener when it is flexed sharply. By virtue of the fact that the outer layers are substantially completely filled with the external thermoplastic compound, there is little tendency for the inner layer or film of less thermoplastic stiffening compound to become dissipated by being squeezed into the external layers under the pressure of the lasting operation. In other words, the internal layer of stiffening compound is maintained substantially undisplaced between the two outer plies to impart to the stiffener structure as it appears in the finished shoe the desired properties of resiliency and flexibility. The thermoplastic compound present in the outer plies being brought to high plasticity and adhesiveness by the heat-conditioning treatment to which the stiffener blank is subjected serves admirably to bond the stiffener to the lining and/or doubler of the shoe upper.

The principles of the present invention are applicable to especial advantage when the internal layer or film of stiffening compound is a thermoplastic resin such as is typified by the vinyl ester resins, e. g., polyvinyl acetate, polyvinyl chloride, polyvinyl benzene, etc. Indeed, the vinyl ester resins are so effective that they may be diluted or compounded with other less expensive materials, as will hereinafter appear, and still give excellent results. We have found that polyvinyl acetate, for instance, lends itself to being laid as a preformed film or spread in plasticized condition in between the outer fibrous layers of the multi-ply stiffener structure of the present invention. Accordingly, the polyvinyl acetate or other polyvinyl resin as a preformed film can be bonded to the outer layers or can be applied in plastic condition by calender rolls or other spreading means in between the outer layers. The three-ply sheet may then be impregnated with a thermoplastic stiffening compound suitable for the outer layers, for instance, rosin, a rosin-bitumen mixture, or a rosin-bitumen-wax mixture. To this end, the composite sheet may be immersed in a bath of the thermoplastic compound which, as already indicated, has a thermoplasticity distinctly greater than that of the internal layer or film of polyvinyl resin. The resulting impregnated product can then be cut into shoe stiffeners.

In the accompanying drawing the figure represents an unskived box toe blank.

The legends on the drawing designate the composition of the various layers. It will, of course, be appreciated that a corner of one of the outer layers is shown pulled away from the internal layer and that part of such latter layer is shown broken away for the purpose of exposing each of the layers. The margins of the box toe blank are preferably skived, as ordinarily.

We have found that a vinyl resin, such as polyvinyl acetate, can be temporarily plasticized for the sheeting or calendering operation most economically and to best advantage through the use of mixtures of water and volatile organic solvents as the plasticizing agents, such mixtures functioning to transform the crystalline resin as it appears on the market into a coherent dough-like mass partaking of many of the properties of rubber cement, including its capability of being sheeted or being calendered onto textile fabric. Upon evaporation of the volatile plasticizing mixture from the sheeted or calendered layer, a highly flexible film or layer resembling celluloid in its flexibility, appearance, and other characteristics results.

In the case of our preferred stiffener containing vinyl resin compound as the internal layer or film, the more thermoplastic stiffening compound in the outer layers or plies serves the added important function of preventing access of perspiration or external moisture to such internal layer, which, when absorbed by such layer, detracts from the qualities of flexibility and resiliency otherwise afforded by such layer. In this connection, it might be observed that the internal layer of vinyl resin compound has some affinity for moisture, but the waterproofing stiffening agent present in the outer plies prevents access of moisture thereto and its deteriorating effects on the stiffener.

A specific example such as may be adopted advantageously in producing a multi-ply shoe stiffener embodying the present invention may be substantially as follows. 500 parts by weight of vinyl acetate may be put into an internal mixer such as is used in rubber compounding, e. g., a Werner and Pfleiderer or a Banbury machine. The polyvinyl acetate may be of the alcohol-solvent variety and have a softening point ranging from about 212° F. to 300° F. About 100 parts by weight of ethyl alcohol may be added to the charge in the mixer and mixing may be effected until all lumps of vinyl acetate have disappeared. About 200 parts by weight of M-grade rosin having a melting point of 175° F. may then be added to the mixer along with 100 parts by weight of a white pigment, such as lithopone, and the charge allowed to mix until a homogeneous mass results, whereupon water may be added to the mass and mixing continued until no more water is absorbed thereby. Depending upon the temperature of the mass and, accordingly, the evaporation of water caused thereby, about 100 to 200 parts by weight of water may be added. Sufficient alcohol, say, about 50 parts by weight, may then be added to the operating mixer to bring the mass to the desired plasticity for sheeting or calendering. At this stage, the mass has a dough-like plasticity or consistency and is so elastic and stretchable that it can be drawn out into filaments. At such consistency, the mass can be readily calendered in between two layers of fabric progressively fed into the nip of a pair of calender rolls, such mass being maintained as a bank at the intake of the rolls and being drawn out or attenuated in the nip of the rolls as a layer or film of predetermined thickness, for instance, a thickness ranging from about 0.002 inch to 0.010 inch. The multi-ply sheet delivered by the calender rolls may then be dried in any suitable way, for instance, by passage over steam-heated drier drums. As the sheet comes off the drier rolls, it can be passed through a bath of molten thermoplastic compound comprising largely rosin, compounded, if desired, with such other thermoplastic materials as bitumen, Montan wax, carnauba wax, etc. Whereas the polyvinyl resin compound introduced as the inner layer in the resulting multiply sheet has a softening point of about 190° F., the molten thermoplastic compound occurring in the external plies preferably has a melting point of about 175° F. It is thus seen that the internal thermoplastic layer is of decidedly lower thermoplasticity than the impregnant of the outer layers, since such impregnant has a melting point lower than even the softening point of the internal layer.

It is preferable that a coarsely woven cotton fabric be used as the outer ply material of the stiffener, as such a layer can be charged with the desired amount of external stiffening composition. Thus, so-called unsized gray goods approximating four yards to the pound and of 28 x 32 yarn count per inch serves admirably as the outer ply material. If desired, however, the outer plies may be other than woven ones, such as water-laid or air-laid felts; and they might be formed by depositing fiber flock onto a preformed layer or film of the vinyl resin compound while the layer is still in a sticky or unset condition, whereupon such plies may be impregnated with the appropriate external stiffening compound.

The principles of the present invention extend to the use of thermoplastic compounds other than vinyl resins for forming the internal layer or film, although, as already indicated, the vinyl resins are preferred for this purpose. Thus, the internal layer may be a rubber compound moldable under elevated temperature non-injurious to the shoe upper but of distinctly lower thermoplasticity than the stiffening agent carried by the external fibrous plies. Artificial resins of suitable thermoplasticity other than the vinyl resins may be employed, the acrolein resins (Acrolyte), the styrol resins, the glyptol resins, and others falling into this category.

Rather than impregnating the plied sheet with rosin or other suitable external stiffening compound, the fabric or fibrous sheet to constitute the outer plies may be initially impregnated with rosin or equivalent compound and two such sheets thus impregnated progressively delivered to the calendering rolls and the rolls operated to lay or spread the plasticized polyvinyl acetate or other polyvinyl resin compound in between such pre-stiffened sheets, the internal layer being sufficiently adhesive or plastic to bond tenaciously to such sheets. Although this procedure has the disadvantage that it is more difficult to evaporate the volatile solvent or liquid plasticizing agent from the internal layer on account of the masking of such layer by the impregnated, comparatively impervious outer plies, yet it has the advantage that the compound constituting the inner layer is largely excluded from the outer plies, that is, is preserved largely as an independent layer imparting to the stiffener in larger measure the various desirable characteristics hereinbefore noted.

We claim:—

1. A laminated shoe stiffener characterized by its thermoplasticity, as a whole, at temperatures non-injurious to leather and consonant with ready moldability thereof to the shape of a last during the lasting of a shoe upper with which it is assembled, comprising outer layers of fibrous material impregnated and substantially completely filled with a thermoplastic compound of high plasticity and adhesiveness under such temperatures and a layer of essentially only thermoplastic compound in between said outer layers of distinctly lower thermoplasticity than said first-named compound, said in-between layer of compound having little tendency to become dissipated in said layers of fibrous material when said thermoplastic compound in said layers has been brought thermally to high plasticity and adhesiveness.

2. A laminated shoe stiffener characterized by its thermoplasticity, as a whole, at temperatures non-injurious to leather and consonant with ready moldability thereof to the shape of a last during the lasting of a shoe upper with which it is assembled, comprising outer layers of fibrous material impregnated and substantially completely filled with a thermoplastic compound of high plasticity and adhesiveness at temperatures of about 200° to 212° F. and a layer of essentially only thermoplastic compound in between said outer layers of distinctly lower thermoplasticity than said first-named compound, said in-between layer of compound having little tendency to become dissipated in said layers of fibrous material when said thermoplastic compound in said layers has been brought thermally to high plasticity and adhesiveness.

3. A laminated shoe stiffener characterized by its thermoplasticity, as a whole, at temperatures non-injurious to leather and consonant with ready moldability thereof to the shape of a last during the lasting of a shoe upper with which it is assembled, comprising outer layers of fibrous material impregnated and substantially completely filled with a rosin composition having a melting point of about 175° F. and a layer of essentially only thermoplastic compound in between said outer layers of distinctly lower thermoplasticity than said first-named composition, said in-between layer of compound having little tendency to become dissipated in said layers of fibrous material when said rosin composition in said layers has been brought thermally to high plasticity and adhesiveness.

4. A laminated shoe stiffener characterized by its thermoplasticity, as a whole, at temperatures non-injurious to leather and consonant with ready moldability thereof to the shape of a last during the lasting of a shoe upper with which it is assembled, comprising outer layers of fibrous material impregnated and substantially completely filled with a thermoplastic compound of high plasticity and adhesiveness at temperatures of about 200° to 212° F. and a substantially fiber-free layer of polyvinyl resin compound in between said outer layers of distinctly lower thermoplasticity than said first-named compound, said in-between layer of polyvinyl resin compound having little tendency to become dissipated in said layers of fibrous material when said thermoplastic compound in said layers has been brought thermally to high plasticity and adhesiveness.

5. A laminated shoe stiffener characterized by its thermoplasticity, as a whole, at temperatures non-injurious to leather and consonant with ready moldability thereof to the shape of a last during the lasting of a shoe upper with which it is assembled, comprising outer layers of fibrous material impregnated and substantially completely filled with a rosin composition and a substantially fiber-free layer of polyvinyl resin compound in between said impregnated outer layers and having a thermoplasticity lower than said rosin composition, said in-between layer of polyvinyl resin compound having little tendency to become dissipated in said layers of fibrous material when said rosin composition in said layers has been brought thermally to high plasticity and adhesiveness.

6. A laminated shoe stiffener characterized by its thermoplasticity, as a whole, at temperatures non-injurious to leather and consonant with ready moldability thereof to the shape of a last during the lasting of a shoe upper with which it is assembled, comprising outer layers of textile fabric impregnated and substantially completely filled with a rosin composition having a melting point of about 175° F. and a substantially fiber-free layer of polyvinyl resin compound in between said outer layers having a softening point higher than about 200° F.

HAROLD S. MILLER.
CHARLES P. MacIVER.